United States Patent
Solanki et al.

(10) Patent No.: US 11,556,122 B2
(45) Date of Patent: Jan. 17, 2023

(54) CONTROL SYSTEM FOR AUTOMATIC GUIDED VEHICLE

(71) Applicant: TE Connectivity Services GmbH, Schaffhausen (CH)

(72) Inventors: Swapnilsinh Solanki, Harrisburg, PA (US); Anthony L. Swann, Lancaster, PA (US); Andrew Spisak, Wrightsville, PA (US); Roberto Francisco-Yi Lu, Bellevue, WA (US); Jiankun Zhou, Middletown, PA (US)

(73) Assignee: TE Connectivity Solutions GmbH

( * ) Notice: Subject to any disclaimer, the term of this patent is extended or adjusted under 35 U.S.C. 154(b) by 382 days.

(21) Appl. No.: 16/933,050

(22) Filed: Jul. 20, 2020

(65) Prior Publication Data
US 2022/0019214 A1 Jan. 20, 2022

(51) Int. Cl.
*B65G 43/08* (2006.01)
*G05D 1/00* (2006.01)
*B25J 5/00* (2006.01)

(52) U.S. Cl.
CPC ........... *G05D 1/0016* (2013.01); *B65G 43/08* (2013.01); *B25J 5/007* (2013.01); *G05D 1/0088* (2013.01); *G05D 2201/0216* (2013.01)

(58) Field of Classification Search
CPC ......... G05D 1/0016; G05D 2201/0216; B65G 43/08
See application file for complete search history.

(56) References Cited

U.S. PATENT DOCUMENTS

| | | | | |
|---|---|---|---|---|
| 5,189,624 | A * | 2/1993 | Barlow | G05B 19/4065 700/169 |
| 7,086,518 | B1 * | 8/2006 | Hranica | B23Q 41/06 700/229 |
| 7,434,730 | B2 * | 10/2008 | Jain | G06Q 10/087 705/28 |
| 2016/0229631 | A1 * | 8/2016 | Kimura | G06Q 10/08 |
| 2021/0284446 | A1 * | 9/2021 | Cairl | G05D 1/0044 |
| 2021/0354922 | A1 * | 11/2021 | Gravelle | B65G 1/065 |

* cited by examiner

*Primary Examiner* — Kyle O Logan (57) ABSTRACT

A vehicle control device for an AGV includes a call box having a user interface and a manual activation element at the user interface accessible to a user. The manual activation element generates a manual call signal. The vehicle control device includes an automated activation element operably coupled to a sensor and receiving a sensor signal from the sensor. The automated activation element generates an automated call signal based on the sensor signal without user intervention. The vehicle control device includes a communication device held by the call box that receives the manual call signal and receiving the automated call signal and communicates with the AGV to trigger operation of the AGV based on both the manual call signal and the automated call signal.

20 Claims, 7 Drawing Sheets

CONTROL SYSTEM FOR AUTOMATIC GUIDED VEHICLE

BACKGROUND OF THE INVENTION

The subject matter herein relates generally to control systems for automatic guided vehicles.

AGVs (Automatic Guided Vehicles) are becoming increasingly popular in production facilities to transport parts and materials autonomously from one location to the another one. AGVs navigate from point-to-point and transport materials. However, conventional systems typically require manual assistance while loading and unloading the materials to and from the AGV. Additionally, the operator must cease working from time to time to interact with the system and the AGV to call the AGV, load the AGV, and wait for the AGV to perform certain tasks, which slow processing and production. Some production facilities that utilize AGVs include a central operator station where a central operator controls the AGVs and sends the AGVs to perform the tasks. Such systems typically involve considerable human intervention in the control of the AGVs. Some know production environments have become automated, with the processing machines communicating directly with the AGVs to process requests with no human intervention in the process. However, automated control of the AGVs has proven difficult to achieve.

A need remains for a robust control system for AGVs.

BRIEF DESCRIPTION OF THE INVENTION

In one embodiment, a vehicle control device for an automatic guided vehicle (AGV) is provided. The vehicle control device includes a call box having a user interface. A manual activation element is at the user interface. The manual activation element is accessible to a user. The manual activation element generates a manual call signal. The vehicle control device includes an automated activation element operably coupled to a sensor and receiving a sensor signal from the sensor, the automated activation element generating an automated call signal based on the sensor signal. The automated call signal is generated without user intervention. The vehicle control device includes a communication device held by the call box. The communication device receives the manual call signal and receiving the automated call signal. The communication device communicates with the AGV and triggering operation of the AGV based on both the manual call signal and the automated call signal.

In another embodiment, an automatic guided vehicle (AGV) control system for an AGV is provided. The AGV control system includes a working station having a frame and a shelf held by the frame. The shelf supports a part bin configured to hold parts. The working station has a sensor configured to sense a bin condition of the part bin. The AGV control system includes a vehicle control device for controlling operation of the AGV. The vehicle control device includes a call box having a user interface and holding a manual activation element, an automated activation element, and a communication device. The call box is coupled to the frame of the working station. The manual activation element is located at the user interface and is accessible to a user. The manual activation element generates a manual call signal. The automated activation element is operably coupled to the sensor and receives a sensor signal from the sensor based on the bin condition. The automated activation element generates an automated call signal based on the sensor signal without user intervention. The communication device receives the manual call signal and receives the automated call signal. The communication device communicates with the AGV and triggers operation of the AGV based on both the manual call signal and the automated call signal.

In a further embodiment, a method of operating an automatic guided vehicle (AGV) is provided. The method communicatively couples a vehicle control device to the AGV. The method sends a manual control signal to the AGV by manually activating a manual activation element at a user interface of the vehicle control device. The method sends an automated control signal to the AGV. The automated control signal is automatically generated without user intervention by an automated activation element operably coupled to a sensor. Both the manual control signal and the automated control signal trigger operation of the AGV from the same vehicle control device.

DETAILED DESCRIPTION OF THE INVENTION

Figure 1:
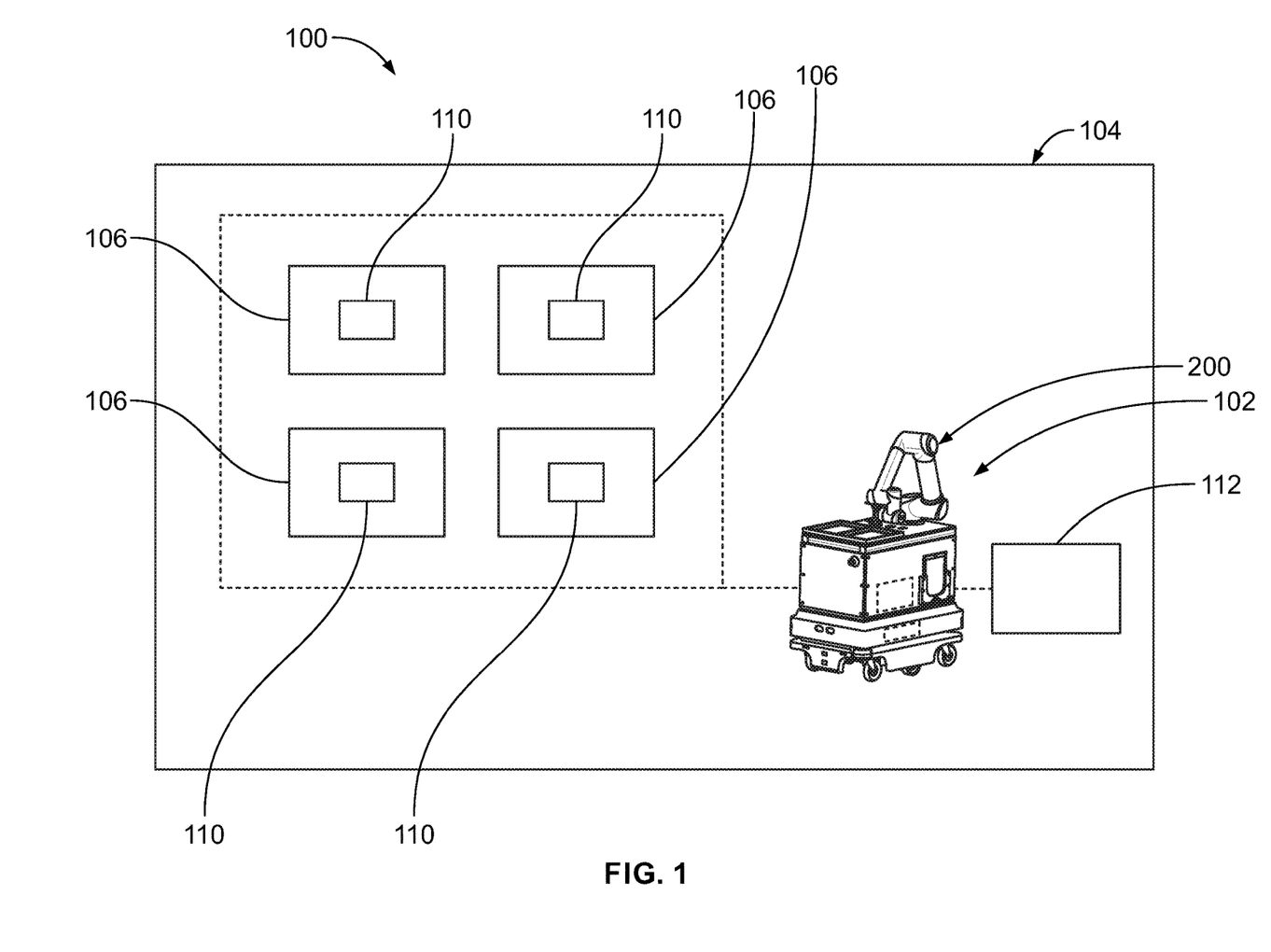
FIG. 1 is a schematic illustration of an automatic guided vehicle (AGV) control system in accordance with an exemplary embodiment.

FIG. 1 is a schematic illustration of an automatic guided vehicle (AGV) control system 100 in accordance with an exemplary embodiment. The AGV control system 100 is used to control movements of an AGV 102 within a logistics facility 104, such as a warehouse, a distribution center, and manufacturing facility, a retail facility, and the like. The AGV 102 may be a mobile robot or autonomous mobile vehicle. Optionally, multiple AGVs 102 may be used within the logistics facility 104 and controlled by the AGV control system 100. The AGV 102 may be used for part picking, part drop-off, part bin retrieval, part bin replacement, and the like within the logistics facility 104. For example, the AGV 102 may be used to pick up parts (for example, individually or in a part bin) from one or more working stations 106, such as manufacturing machines, part assembly machines, part sorting machines, storage bins, and the like. In various embodiments, the working station(s) 106 may be manned working stations where an operator or user is stationed at the working station to perform a manufacturing or sorting process at the working station 106. The AGV 102 may be used to drop off parts (for example, individually or in a part bin) at other machines, such as other manufacturing machines, storage bins, and the like.

In an exemplary embodiment, the AGV control system 100 includes a vehicle control device 110 located within the logistics facility 104. The vehicle control device 110 is communicatively coupled to the AGV 102 to control the AGV 102 within the logistics facility 104, such as movement of the AGV 102 to/from the working station 106. The vehicle control device 110 may control movement of the AGV 102 between the multiple working stations 106. The AGV 102 may transport the parts and/or bins autonomously from one location to another, such as between the working stations 106 based on control signals received from the vehicle control device 110.

In an exemplary embodiment, the vehicle control device 110 is coupled to one of the working stations 106. In various embodiments, each working station 106 may include an associated vehicle control device 110 coupled thereto. The vehicle control device 110 may control AGV movement to/from the associated working station 106. In an exemplary embodiment, the vehicle control device 110 is operable in a manual call mode wherein the AGV 102 may be manually called to perform a task at the working station 106 and the vehicle control device 110 is operable in an automatic call mode wherein the AGV 102 is automatically called to perform a task at the working station 106. As such, the vehicle control device 110 is capable of automatic control and manual control of the AGV 102. For example, an operator or user may manually call the AGV 102 to the working station 106, such as to bring parts to the working station 106, to bring an empty part bin to the working station 106, to pick up parts or a part bin from the working station 106, or to perform other tasks at the working station 106. At various times, the AGV 102 may be automatically summoned to the working station 106 without user intervention, such as to bring parts to the working station 106, to bring an empty part bin to the working station 106, to pick up parts or a part bin from the working station 106, or to perform other tasks at the working station 106.

In an exemplary embodiment, the logistics facility 104 includes a docking station 112 for the AGV 102. The docking station 112 may be used to store and or charge the AGV 102. In an exemplary embodiment, the AGV 102 returns to the docking station 112 after performing one or more tasks to recharge the AGV 102. The docking station 112 may be provided at the working station(s) 106 in various embodiments.

The AGV 102 navigates autonomously from point-to-point within the logistics facility 104, such as to pick up parts, drop off parts, inventory parts, or return to the docking station 112. For example, the AGV 102 moves along one or more paths through the logistics facility 104 between the docking station 112 and the working stations 106. The AGV 102 includes a collaborative manipulator 200, such as a robot arm or a conveyor, for performing tasks.

Figure 2:
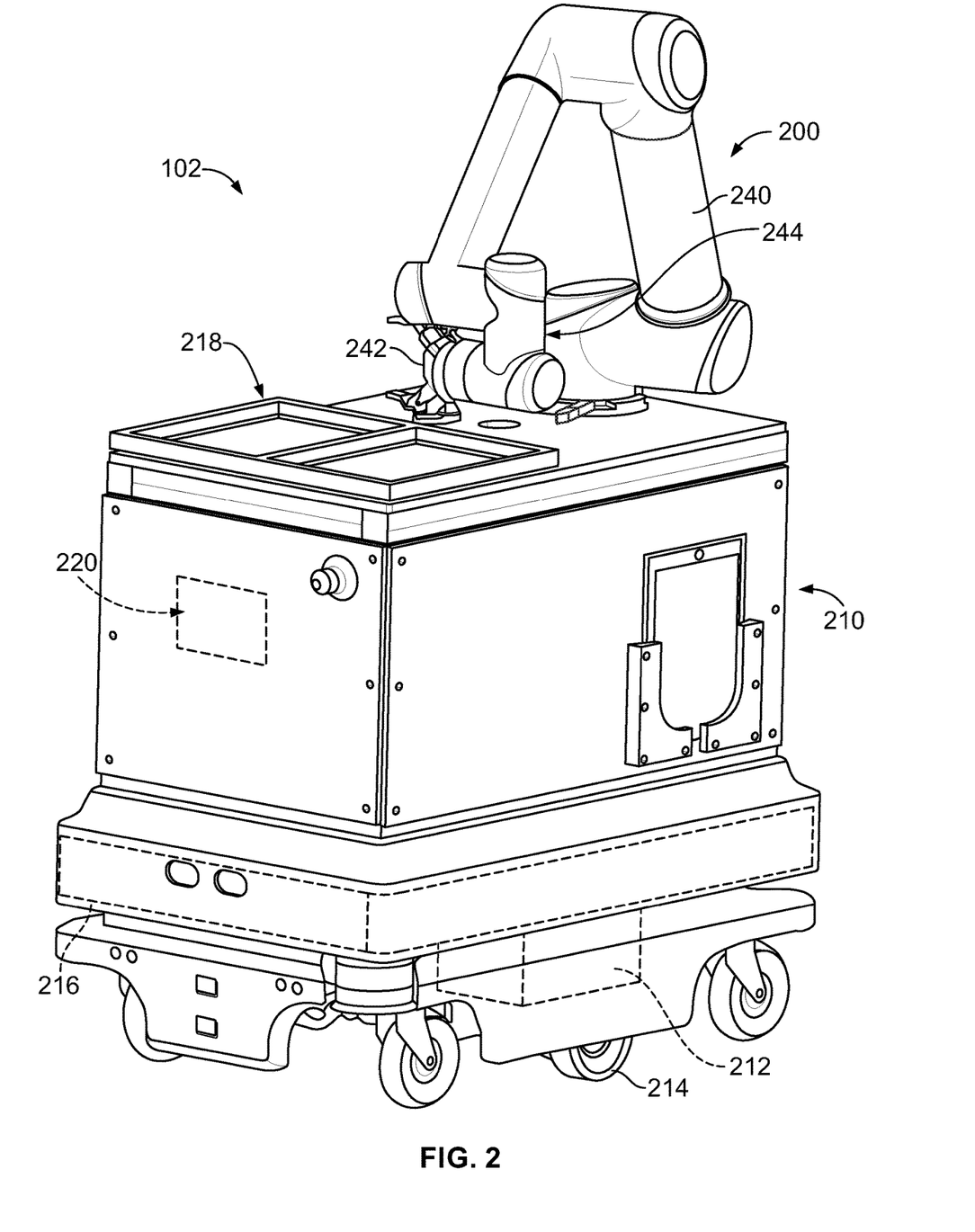
FIG. 2 is a front perspective view of an AGV in accordance with an exemplary embodiment.

FIG. 2 is a front perspective view of the AGV 102 in accordance with an exemplary embodiment. The AGV 102 includes a cart 210 housing a motor 212 and wheels 214 driven by the motor 212 to move the AGV 102. The AGV 102 includes a battery 216 coupled to the motor 212 to power the motor 212. The collaborative manipulator 200 is mounted to the cart 210, such as to a top 218 of the cart 210.

In an exemplary embodiment, the AGV 102 includes an AGV controller 220 for controlling movement of the AGV 102. The AGV controller 220 is operably coupled to the motor 212. The AGV controller 220 controls operation of the motor 212 to move the AGV 102. The AGV controller 220 may control an ON/OFF mode of the motor 212, may control an operating speed of the motor 212, may control an operating direction of the motor 212, and the like. The AGV controller 220 is communicatively coupled to the vehicle control device 110 (shown in FIG. 1) to receive control signals for operating the AGV 102. For example, the AGV controller 220 may receive route information to guide the AGV 102 along a particular path, such as between the docking station 112 and the working stations 106 (shown in FIG. 1). The AGV controller 220 may receive information instructing the AGV 102 to stop, to move forward, to move rearward, and/or to turn right or left for controlling movement of the AGV 102.

In an exemplary embodiment, the collaborative manipulator 200 includes an arm 240 and a gripper 242 at a distal end 244 of the arm 240 used for picking up the parts/bins and moving the parts/bins to or from the cart 210. The arm 240 may be a four-axis manipulating arm or a six-axis manipulating arm in various embodiments. Other types of robot arms may be used in alternative embodiments. In other various embodiments, other types of part manipulators may be utilized rather than the gripper 242 and/or the arm 240. For example, the collaborative manipulator 200 may include a conveyor or other type of manipulator.

Figure 3:
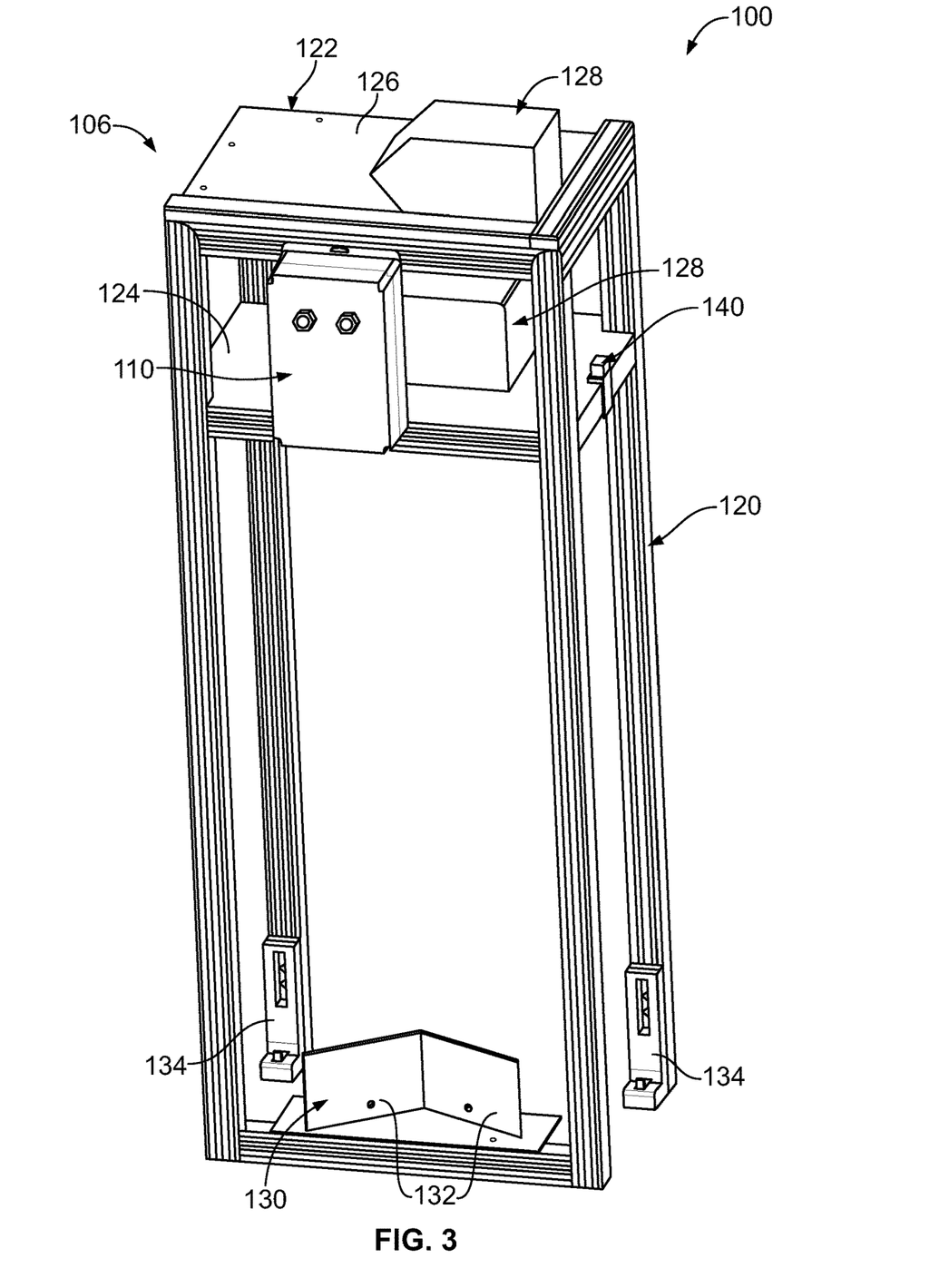
FIG. 3 illustrates the AGV control system in accordance with an exemplary embodiment.

FIG. 3 illustrates the AGV control system 100 in accordance with an exemplary embodiment. The AGV control system 100 includes the vehicle control device 110 at the working station 106. The working station 106 includes a frame 120 and a working platform 122 at a top of the frame 120. The working platform 122 includes one or more shelves, such as a lower shelf 124 and an upper shelf 126. Part bins 128 may be positioned on the shelves 124, 126. The part bins 128 hold parts, which may be assembled or sorted at the working platform 122. In various embodiments, the part bin 128 on the lower shelf 124 may be empty, while the part bin 128 on the upper shelf 126 may be filled by the operator. When filled, the part bin 128 may be picked up by the AGV 102 and replaced with an empty bin from the lower shelf 124 or with an empty bin delivered by the AGV 102. The bin 128 on the lower shelf 124 may be a full part bin rather than an empty part bin, such as for processing (for example, sorting or assembly) at the working platform 122.

In an exemplary embodiment, the working station 106 includes a marker 130 having one or more datum surfaces 132. The marker 130 receives the AGV 102 when the AGV 102 travels to the working station 106. The AGV 102 may engage the datum surface 132 to position the AGV 102 relative to the working station 106. In various embodiments, the marker 130 may form part of the docking station 112 that receives the AGV 102. In such embodiments, the AGV 102 may be recharged at the working station 106. In an exemplary embodiment, the working station 106 includes mounting brackets 134 coupled to the frame 120 and/or the marker 130 to mount the working station 106 at a designated area, such as to the floor of the logistics facility 104.

In an exemplary embodiment, the working station 106 includes one or more sensors 140 configured to sense a bin condition of the part bin 128. The sensor 140 is communicatively coupled to the vehicle control device 110. Signals from the sensor 140 are transmitted to the vehicle control device 110. In the illustrated embodiment, the sensor 140 is provided at the lower shelf 124. Additionally, or alternatively, the sensor 140 may be provided at the upper shelf 124. The sensor 140 is a proximity sensor in various embodiments. The proximity sensor is used for detecting the presence or absence of the part bin 128 on the lower shelf 124. For example, the proximity sensor determines when the part bin 128 is removed from the lower shelf 124 to trigger the AGV 102 to bring another part bin 128 to the working station 106. The sensor 140 may include a photo-eye sensor. Other types of sensors may be used in alternative embodiments. For example, the sensor may be a pressure sensor or a force sensor to detect the presence of the part bin 128 and/or if the part bin is empty or full of parts. Other types of sensors may be used in alternative embodiments, such as a temperature sensor, a humidity sensor, and the like.

In an exemplary embodiment, the vehicle control device 110 is mounted to the frame 120 of the working station 106. The vehicle control device 110 is accessible to the operator working at the working station 106. The vehicle control device 110 communicates with the AGV 102 to control operations of the AGV 102. For example, the vehicle control device 110 may call the AGV 102 to pickup the parts bins 128 from the working station 106 and/or to bring empty part bins 128 to the working station 106. In an exemplary embodiment, the vehicle control device 110 communicates with the AGV 102 over a wireless communication network, such as a Wi-Fi network.

Figure 4:
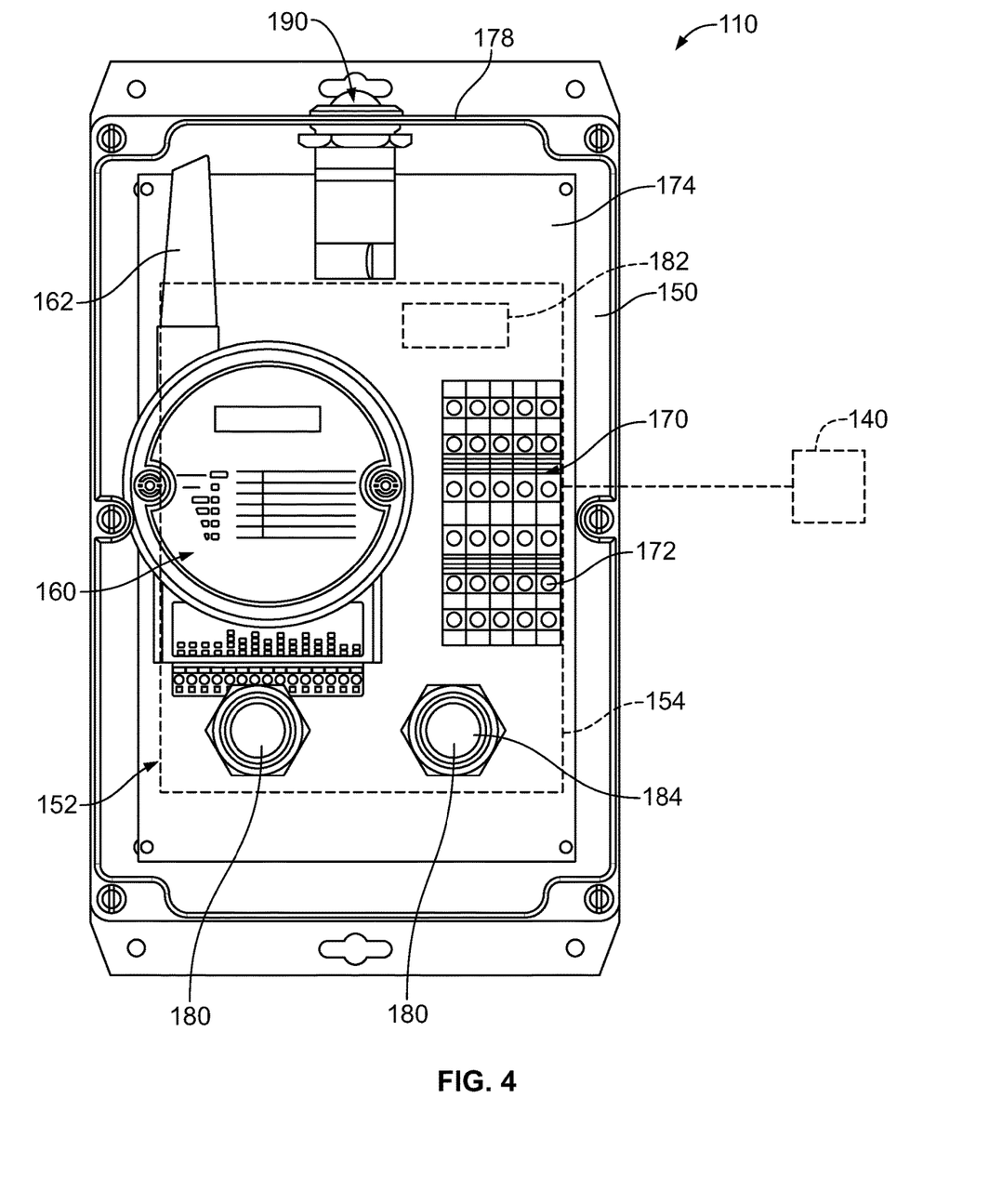
FIG. 4 illustrates the vehicle control device in accordance with an exemplary embodiment.

FIG. 4 illustrates the vehicle control device 110 in accordance with an exemplary embodiment. The vehicle control device 110 includes a call box 150 having a user interface 152. The vehicle control device 110 includes a controller 154 housed within the call box 150. The controller 154 may include a circuit board or other control circuit to control operation of the vehicle control device 110. The controller 154 may receive inputs and generate outputs to control operation of the vehicle control device 110.

The vehicle control device 110 includes a communication device 160 held by the call box 150. The communication device 160 is connected to the controller 154. The communication device 160 is configured to communicate with the AGV 102. In an exemplary embodiment, the communication device 160 includes an antenna 162 for wireless communication with the AGV 102.

The vehicle control device 110 includes an input device 170 held by the call box 150. The input device 170 is connected to the controller 154. The input device 170 receives inputs from remote elements, such as the sensor(s) 140. In an exemplary embodiment, the input device 170 includes terminal blocks 172 configured to receive wires routed to the sensor 140. Other types of input devices may be provided in alternative embodiments. In the illustrated embodiment, the input device 170 is provided at a front 174 of the call box 150. However, the input device 170 may be at other locations in alternative embodiments, such as at the sides of the call box 150, the top of the call box 150, the bottom of the call box 150, the rear of the call box 150, or at another location.

The vehicle control device 110 includes one or more manual activation elements 180 and one or more automated activation elements 182. The manual activation elements 180 are provided at the user interface 152, such as at the front 174 of the call box 150. The manual activation elements 180 may be provided at other locations, such as at a top 178 of the call box 150. The manual activation elements 180 are accessible to the user of the working station 106 for manual activation by the user. The manual activation elements 180 are coupled to the controller 154. The manual activation elements 180 generate a manual call signal for the AGV 102. The manual call signal is transmitted by the communication device 160. In various embodiments, the manual activation elements 180 include push buttons 184. Other types of manual activation elements 180 may be provided in alternative embodiments, such as levers, switches, a touchscreen, a voice activation device, such as a microphone, and the like. In the illustrated embodiment, multiple manual activation elements 180 are provided. Each manual activation element 180 may be used for a different action. For example, one of the manual activation elements 180 may be activated to call the AGV 102 to pickup one of the part bins 128. One of the manual activation elements 180 may be activated to call the AGV 102 to bring a part bin to the working station 106, such as an empty part bin or a part bin having needed parts, such as for processing or assembly at the working platform 122. Other manual activation elements 180 may be provided to perform other actions.

The automated activation element 182 is connected to the controller 154. The automated activation element 182 is operably coupled to the sensor 140, such as through the input device 170. The automated activation element 182 receives sensor signals from the sensor 140. The automated activation element 182 generates automated call signals for the AGV 102. The automated call signals are transmitted by the communication device 160. The vehicle control device 110 forms a communication link between the sensor 140 and the AGV 102. The automated activation element 182 generates the automated call signals for the AGV 102 based on sensed conditions of the part bins 128 at the working station 106. In various embodiments, the automated call signal may be generated when the part bin 128 is removed from the shelf 124. For example, the part bin 128 on the lower shelf 124 may be an empty part bin. When the operator needs an empty part bin, the operator removes the part bin 128 from the lower shelf 124 and puts the empty part bin on the working surface of the upper shelf 126. When the empty part bin is removed, the sensor 140 detects such removal and generates a corresponding automated call signal to trigger the AGV 102 to bring another part bin to the working station 106, such as another empty part bin. The automated call signal is generated without intervention by the operator and thus allows the operator to continue working. In other various embodiments, the automated call signal may be generated when the part bin 128 is full. For example, the sensor may be a weight sensor and the automated call signal may be generated when the weight of the part bin 128 exceeds a predetermined weight. The automated call signal may be generated when a part bin is placed on a shelf and sensed by the sensor 140. For example, when the operator fills the part bin, the part bin may be placed at a predetermined location on one of the shelves, such as proximate to the sensor 140. When the presence of such part bin is detected, the automated activation element 182 may generate a corresponding automated call signal to trigger the AGV 102 to travel to the working station 106 and remove the part bin 128.

The vehicle control device 110 includes an indicator 190 on the call box 150. The indicator 190 may be a visual indicator, such as an LED indicator. The indicator 190 provides an indication to the operator that a call signal has been sent to the AGV 102. Optionally, multiple indicators 190 may be provided indicating different call signals being sent. Optionally, the indicator 190 may provide a status indicator of the AGV 102. For example, the indicator 190 may show different colors or may blink at different rates for different status indications. In other various embodiments, the indicator 190 may be a display configured to display characters, such as numbers or letters to the operator for AGV status indication.

Figure 5:
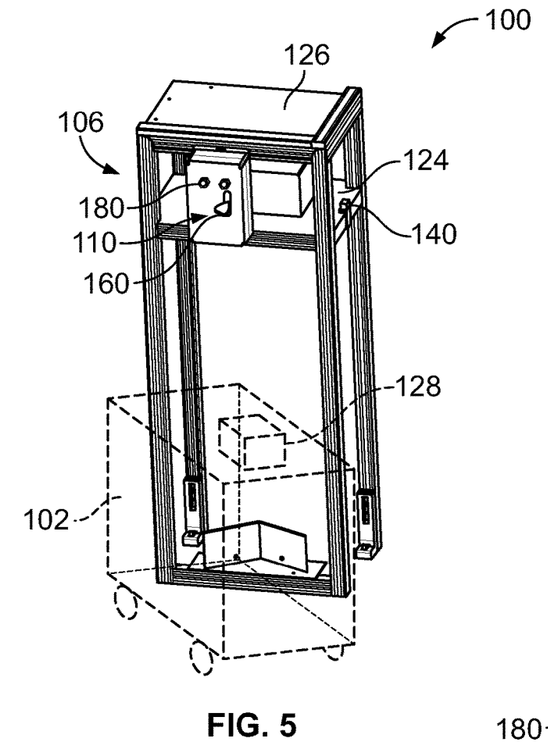
FIG. 5 illustrates the AGV control system in a manual call mode in accordance with an exemplary embodiment.

FIG. 5 illustrates the AGV control system 100 in a manual call mode in accordance with an exemplary embodiment showing the AGV 102 at the working station 106 after a manual call signal to pick up the part bin 128 from the working station 106. In an exemplary embodiment, the manual activation element 180 of the vehicle control device 110 is manually activated to trigger operation of the AGV 102 to retrieve the part bin 128 (for example, when the part bin is full) from the working station 106. The manual activation element 180 generates a manual call signal for the AGV 102 and the manual call signal is transmitted by the communication device 160 to the AGV 102. Other manual activation elements 180 may be provided to perform other actions. When the part bin 128 is removed from the upper shelf 126, the part bin 128 at the lower shelf 124 may be moved to the upper shelf 126 and the operator may continue to process the parts, such as to fill the part bin 128. In various embodiments, when the part bin 128 is removed from the lower shelf 124, the sensor 140 detects such removal and triggers another task for the AGV 102 to retrieve another part bin 128 and replace the part bin at the lower shelf 124. In various embodiments, when the AGV 102 removes the part bin from the upper shelf 126, the AGV 102 may be programmed to automatically retrieve an empty part bin to bring the empty part bin 128 to the working station 106.

Figure 6:
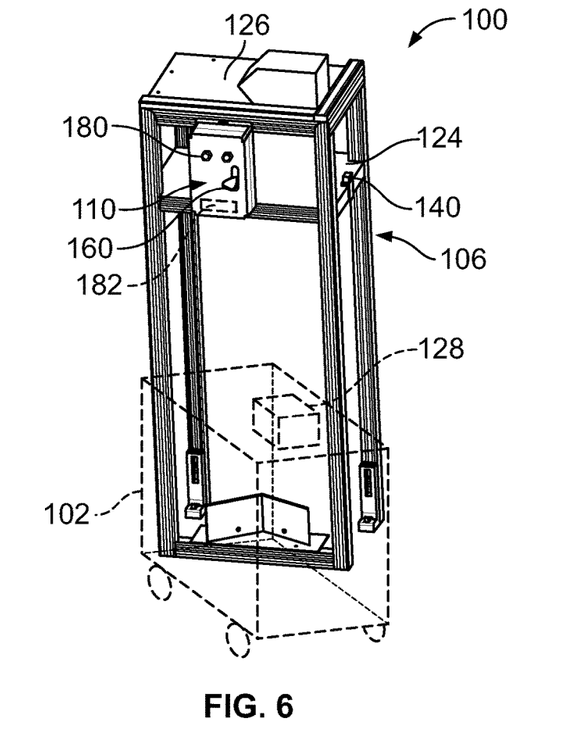
FIG. 6 illustrates the AGV control system in an automated call mode in accordance with an exemplary embodiment.

FIG. 6 illustrates the AGV control system 100 in an automated call mode in accordance with an exemplary embodiment showing the AGV 102 at the working station 106 after an automated call signal to replace the part bin 128 at the working station 106. In an exemplary embodiment, the automated activation element 182 of the vehicle control device 110 is automatically activated to trigger operation of the AGV 102 to retrieve an empty part bin 128, such as from an empty part bin storage and replenish the part bin 128 taken from the lower shelf 124. When the part bin 128 is removed from the lower shelf 124 (for example, moved to the upper shelf 126), the automated activation element 182 generates an automated call signal for the AGV 102 and the automated call signal is transmitted by the communication device 160 to the AGV 102. The automated activation element 182 may include other triggers to perform other actions. For example, the sensor 140 detects such removal and triggers a task for the AGV 102 to retrieve another empty part bin 128 and replace the empty part bin at the lower shelf 124.

Figure 7:
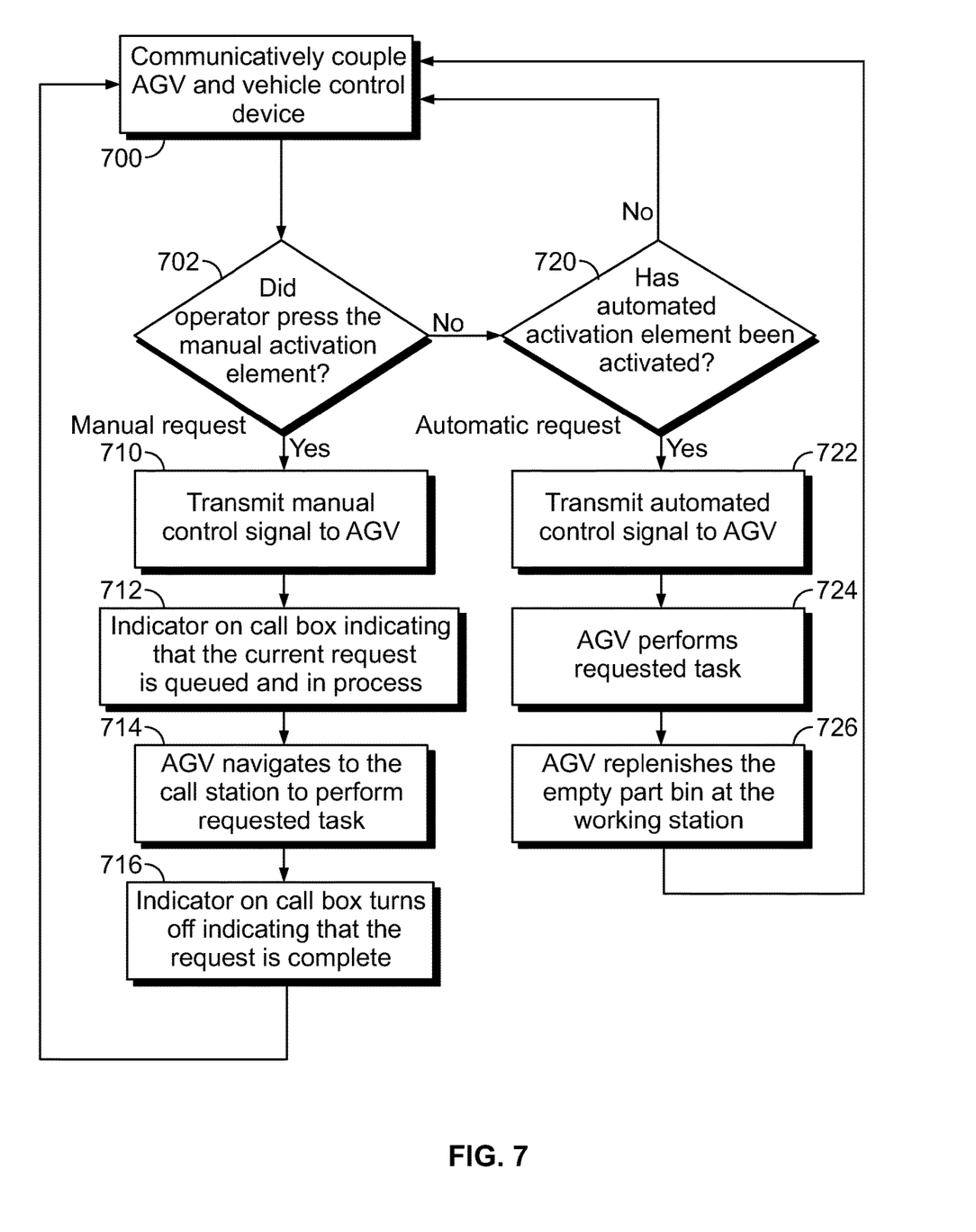
FIG. 7 is a flow chart showing a method of operating an AGV in accordance with an exemplary embodiment.

FIG. 7 is a flow chart showing a method of operating an AGV in accordance with an exemplary embodiment. The AGV control system is used to control the AGV. For example, the vehicle control device generates control signals and communicates with the AGV to trigger operation and tasks for the AGV.

At 700, the AGV control system communicatively couples the AGV and the vehicle control device. At 702, the AGV control system determines if the operator presses the manual activation element on the call box. The manual activation element may be a call button or a pushbutton at the user interface of the call box. The manual activation element may be activated by the operator when the part bin is full to task the AGV with removing the full part bin and transporting the full part bin to a designated destination, such as a sorting station, a packaging station, or another working station.

When the manual request is triggered, at 710, a manual control signal is transmitted to the AGV and the task is queued in the AGV controller. At 712, the indicator on the call box is activated indicating that the current request is queued and in process. For example, an LED on the call box may be lit to provide a visual indicator to the operator. At 714, the AGV navigates to the working station to perform the requested task. For example, the AGV may navigate to the marker of the working station to position the AGV relative to the working platform of the working station to retrieve the full part bin. At 716, after the AGV has performed the task, the indicator is turned off indicating that the request has been completed then the process returns to step 700.

If the manual request has not been triggered, at 720, the AGV control system determines if the automated activation element has been activated. If the sensor activation element has not been activated, the process returns to step 700. If the sensor activation element has been activated, at step 722, an automated control signal is transmitted to the AGV and the task is queued in the AGV controller. At 724, the AGV performs the requested task. For example, the AGV navigates to a bin storage area to pick up an empty part bin. The AGV then navigates to the working station. At 726, the AGV replenishes the empty part bin at the working station. For example, the AGV may manipulate the part bin using collaborative manipulator 200 and place the part bin on the lower shelf of the working station. The process then returns to step 700. Optionally, when performing the automatic request, the indicator may be activated to indicate that the request has been queued and is in process. After the task is performed, the indicator may be deactivated to indicate that the request is complete.

Figure 8:
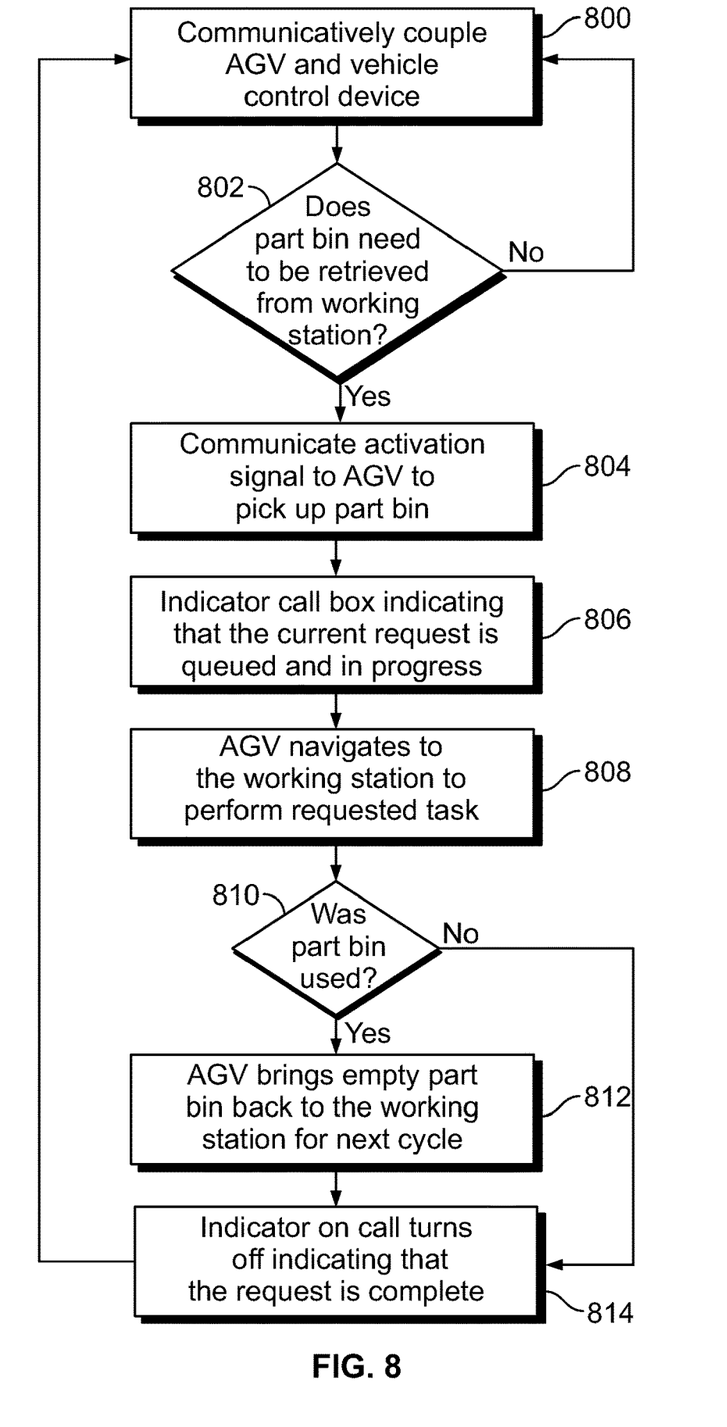
FIG. 8 is a flow chart showing a method of operating an AGV in accordance with an exemplary embodiment.

FIG. 8 is a flow chart showing a method of operating an AGV in accordance with an exemplary embodiment. The AGV control system is used to control the AGV. For example, the vehicle control device generates control signals and communicates with the AGV to trigger operation and tasks for the AGV.

At 800, the AGV control system communicatively couples the AGV and the vehicle control device. At 802, the AGV control system determines if a part bin needs to be retrieved from the working station. For example, the vehicle control device of the working station may send a manual activation signal or an automated activation signal to the AGV. The manual activation signal may be generated when a manual activation element, such as a call button or a pushbutton, is activated by the operator. The automated activation signal may be generated automatically, such as by a sensor or other element monitoring one or more characteristics of the part bins. If no activation signal is received by the AGV, the AGV takes no action and the process returns to step 800.

When the vehicle control device generates an activation signal, at 804, the vehicle control device communicates the activation signal to the AGV to pick up the part bin from the working station and the task is queued in the AGV controller. At 806, the indicator on the call box is activated indicating that the current request is queued and in process. For example, an LED on the call box may be lit to provide a visual indicator to the operator. At 808, the AGV navigates to the working station to perform the requested task. For example, the AGV may navigate to the marker of the working station to position the AGV relative to the working platform of the working station to retrieve the part bin. The collaborative manipulator of the AGV is operated to pick up the part bin and placed the part bin on the card of the AGV. The AGV then transports the part bin to a designated destination.

At 810, the vehicle control device determines if the part bin was used and removed from the working station. If the part bin was removed from the working station, at 812, the vehicle control device automatically queues a secondary task at the AGV controller to task the AGV with replenishing the empty part bin at the working station. At 814, the indicator is deactivated to indicate that the request is complete and the process returns to step 800. The indicator is deactivated after the AGV replenishes the empty part bin.

Returning to step 810, if the vehicle control device determines that a part bin was not removed from the working station, the process proceeds to step 814 to deactivate the indicator and then the process returns to step 800.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vehicle control device for an automatic guided vehicle (AGV) comprising:
    a call box having a user interface;
    a manual activation element at the user interface, the manual activation element being accessible to a user, the manual activation element generating a manual call signal;
    an automated activation element operably coupled to a sensor and receiving a sensor signal from the sensor, the automated activation element generating an automated call signal based on the sensor signal, the automated call signal being generated without user intervention; and
    a communication device held by the call box, the communication device receiving the manual call signal and receiving the automated call signal, the communication device communicating with the AGV and triggering operation of the AGV based on both the manual call signal and the automated call signal.

2. The vehicle control device of claim 1, wherein the communication device transmits trigger signals to the AGV causing the AGV to perform a first task when the manual call signal is received and causing the AGV to perform a second task when the automated call signal is received, the second task being different than the first task.

3. The vehicle control device of claim 1, wherein the communication device transmits a manual control signal to the AGV when the manual call signal is received and the communication device transmits an automated control signal to the AGV when the automated call signal is received.

4. The vehicle control device of claim 1, wherein the manual activation element is a push button.

5. The vehicle control device of claim 1, wherein the call box includes an indicator, the indicator being operated when the manual activation element is activated.

6. The vehicle control device of claim 5, wherein the indicator is operated when the automated activation element is activated.

7. The vehicle control device of claim 1, wherein the communication device communicates over a wireless communication network with the AGV.

8. The vehicle control device of claim 1, wherein the sensor is located remote from the call box.

9. The vehicle control device of claim 1, wherein the manual activation element is a first manual activation element, the vehicle control device further comprising a second manual activation element at the user interface, the second manual activation element being accessible to the user, the second manual activation element generating a second manual call signal different than the manual call signal generated by the first manual activation element.

10. The vehicle control device of claim 1, wherein the sensor is a proximity sensor sensing presence of a part bin, the sensor signal being sent when the part bin is removed.

11. The vehicle control device of claim 1, wherein the manual activation element is activated to call the AGV for removal of a part bin from a working station associated with the call box.

12. The vehicle control device of claim 1, wherein the automated activation element is activated to call the AGV to bring a part bin to a working station associated with the call box.

13. An automatic guided vehicle (AGV) control system for an AGV comprising:
    a working station having a frame and a shelf held by the frame, the shelf supporting a part bin configured to hold parts, the working station having a sensor configured to sense a bin condition of the part bin; and
    a vehicle control device for controlling operation of the AGV, the vehicle control device including a call box having a user interface and holding a manual activation element, a automated activation element, and a communication device, the call box being coupled to the frame of the working station, the manual activation element being located at the user interface and being accessible to a user, the manual activation element generating a manual call signal, the automated activation element being operably coupled to the sensor and receiving a sensor signal from the sensor based on the bin condition, the automated activation element generating an automated call signal based on the sensor signal without user intervention, the communication device receiving the manual call signal and receiving the automated call signal, the communication device communicating with the AGV and triggering operation of the AGV based on both the manual call signal and the automated call signal.

14. The AGV control system of claim 13, wherein the frame includes a marker having a datum surface, the marker receiving the AGV against the datum surface to locate the AGV relative to the working station.

15. The AGV control system of claim 13, wherein the working station further comprises a second shelf supporting a second part bin, the vehicle control device causing the AGV to remove the second part bin when the manual call signal is generated.

16. The AGV control system of claim 13, wherein the automated call signal is generated automatically when the part bin is removed from the shelf.

17. A method of operating an automatic guided vehicle (AGV), the method comprising:
- communicatively coupling a vehicle control device to the AGV;
- sending a manual control signal to the AGV by manually activating a manual activation element at a user interface of the vehicle control device; and
- sending an automated control signal to the AGV, the automated control signal being automatically generated without user intervention by a automated activation element operably coupled to a sensor;
- wherein both the manual control signal and the automated control signal trigger operation of the AGV from the same vehicle control device.

18. The method of claim 17, further comprising receiving the manual control signal at the AGV and operating the AGV to pick up a part bin from a working station associated with the vehicle control device based on the manual control signal.

19. The method of claim 18, further comprising operating the AGV to bring an empty part bin to the working station after the part bin was removed.

20. The method of claim 17, further comprising receiving the automated control signal at the AGV and operating the AGV to bring an empty part bin to a working station associated with the vehicle control device based on the automated control signal.

* * * * *